No. 809,038. PATENTED JAN. 2, 1906.
C. B. WILLIAMS.
TRAP NEST FOR LAYING HENS.
APPLICATION FILED MAR. 20, 1905.
2 SHEETS—SHEET 1.
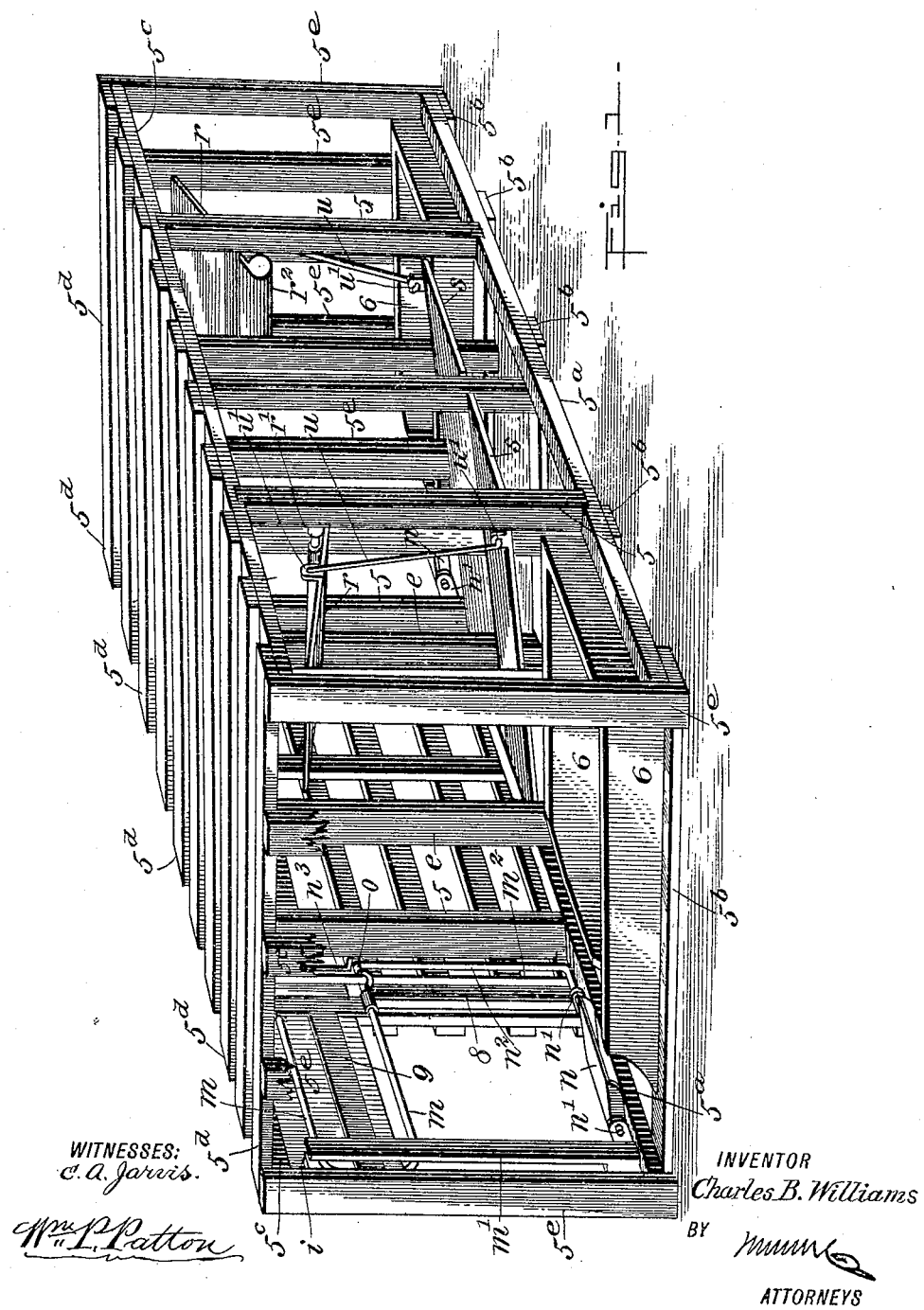
WITNESSES:
C. A. Jarvis.
Wm. L. Patton
INVENTOR
Charles B. Williams
BY
ATTORNEYS

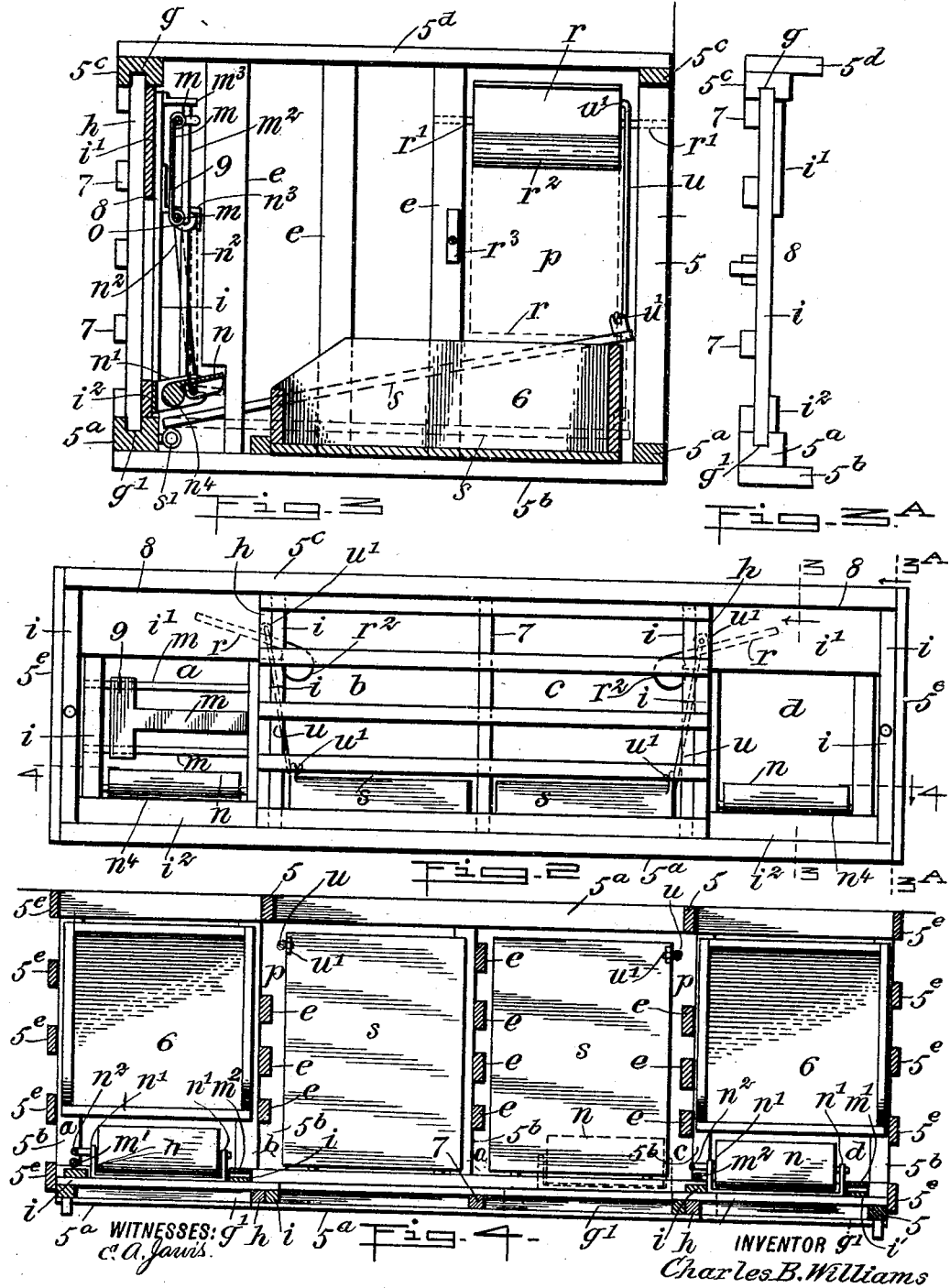

UNITED STATES PATENT OFFICE.

CHARLES B. WILLIAMS, OF ONTARIO, CALIFORNIA.

TRAP-NEST FOR LAYING HENS.

No. 809,038.     Specification of Letters Patent.     Patented Jan. 2, 1906.

Application filed March 20, 1905. Serial No. 250,965.

*To all whom it may concern:*

Be it known that I, CHARLES BYRON WILLIAMS, a citizen of the United States, and a resident of Ontario, in the county of San Bernardino and State of California, have invented a new and Improved Trap-Nest for Laying Hens, of which the following is a full, clear, and exact description.

Poultry raisers find it of great advantage to test the laying capacity of domestic hens of different strains to determine which are most profitable in the way of production of eggs.

This invention relates to a novel trap-nest which will freely admit a hen to the nest, hold her confined as long as is necessary, and upon leaving the nest admit the hen to an adjoining compartment, automatically close a door between this compartment and the nest and confine the hen until removed by an attendant, thus preventing the hen from eating the egg, if one is laid, and by tagging her test the laying capacity of individual hens and of the strain of fowls that the trapped one represents.

The invention consists in the novel construction and combination of parts, as is hereinafter described, and defined in the appended claims.

Reference is to be had to the accompanying drawings, forming a part of this specification, in which similar characters of reference indicate corresponding parts in all the views.

Figure 1 is a perspective view of the improved trap-nest, parts being broken away to expose details. Fig. 2 is a front view of the device. Fig. 3 is an enlarged transverse sectional view substantially on the line 3 3 in Fig. 2. Fig. 3$^A$ is a transverse sectional view on the line 3$^A$ 3$^A$ in Fig. 2, showing the front portion of the frame of one nest and the slidable door which controls the entrance thereto, other details being omitted; and Fig. 4 is a partly-sectional plan view substantially on the line 4 4 in Fig. 2.

It is preferred to combine two of the improved nests in one main rectangular frame, and thus be enabled to test the comparative value of different strains of chickens as egg-layers and also of different ones considered individually. It is found advantageous for cleanliness, the saving of material, and to enable the thorough inspection of the interiors of the twin nests that the main frame holding the nests be open throughout its body and preferably formed of spaced upright posts 5, that are erected upon two longitudinal base-strips 5$^a$, held spaced apart parallel with each other by the transverse base-strips 5$^b$, secured upon their lower sides. Two similar longitudinal frame-strips 5$^c$ are secured upon the upper portions of the posts 5 parallel with the strips 5$^a$, and upon these strips 5$^c$ at suitable intervals the transverse strips or slats 5$^d$ are mounted and secured. The main slatted frame is completed by the attachment of the spaced upright strips 5$^e$ at each end thereof, they being held in place by securing their ends on the adjacent upper and lower transverse strips 5$^b$ and 5$^d$. The interior of the main frame for the two nests is divided into four preferably equal compartments $a$, $b$, $c$, and $d$ by three upright partitions formed of slats $e$, that are secured upon transverse strips 5$^b$ and 5$^d$ at proper distances apart. Upon the two spaced transverse base-strips 5$^b$, adjacent to each end wall of the main frame, two similar nest-boxes 6 are loosely seated, each of said boxes, preferably formed of thin wooden boards, being rectangular and closed at the bottom, but open at the top for the reception of straw or any other suitable material for the formation of nests, and, as shown clearly in Fig. 4, the nest-boxes 6 when in position in the respective compartments $a$ and $d$ leave sufficient space at their front to permit the location of other details in the forward portions of said compartments.

The longitudinally-disposed frame-strips 5$^a$ and 5$^c$ at the front of the main frame are centrally grooved in their upper and lower sides, as is shown at $g$ $g'$ in Figs. 3 and 3$^a$, and in said grooves the upper and lower ends of the end stiles $h$ of a slatted main door 7 are loosely held, the longitudinal slats of said door being secured upon the outer sides of the stiles $h$. The door 7 is of sufficient length to close the two intermediate compartments $b$ $c$ when adjusted so that the end stiles $h$ are equally distant from the end walls of the main frame, thus leaving the nest-holding compartments $a$ and $d$ open. For the independent closure of the end compartments $a$ and $d$ at their front similar gates 8 8 are provided. Each gate 8 is in the form of a rectangular frame having two side stiles $i$ $i$ held spaced apart and parallel with each other by a broad panel $i'$, secured across the stiles on their inner sides near their upper ends, and by a transverse rail $i^2$, which is affixed upon the lower end portions of said stiles on their inner surfaces. The stiles $i$ $i$ extend at their upper and lower ends a short distance beyond the upper and lower edges of the panel $i'$ and cross-rail $i^2$, thus affording tenons which are loosely fitted within the longitudinal grooves $g$ $g'$. The length of the panels $i'$ and of the transverse rails $i^2$ is such that when the stile $i$ nearest the end wall of the main frame impinges thereon, as shown in Fig. 2, the other stile $i$ of said gate-frame is positioned at the side edge of the stile $h$ nearest to a slatted partition $e$, so that the projecting ends of the stiles $h$ and $i$ slide in the grooves $g$ $g'$, the clearance had by the panel $i'$ and transverse rail $i^2$ of each door-frame permitting such a sliding adjustment to be made. The parts of the twin trap-nests are so proportioned that a hen seeking a nest in either box 6 may pass freely in through the opening in a respective gate-frame 8.

Upon the inner side of each gate-frame 8 a slatted wicket 9 is slidably supported by the loose engagement of similar ends of its slats $m$, which are nearest a respective end wall of the main frame between a stile $i$ on the gate-frame and an upright guide-strip $m'$, held at its ends on the inner side of said stile and spaced therefrom, so as to produce a slot between the stile and strip. The remaining ends of the slats $m$ are loosely mounted upon an upright guide-rod $m^2$, which at its upper and lower ends is supported upon projections $m^3$ on the inner side of the door-stile $i$ farthest from a respective end wall of the main frame. The wicket 9 for each gate-frame 8 is of sufficient weight to drop by gravity when permitted to do so, and thus close the opening in the door-frame upon which it is mounted, and the height of the wicket is such that when fully raised it will pass behind the panel $i'$ and open the passage through the gate-frame.

At the inner side and upper edge of the transverse rail $i^2$ on each gate-frame 8 a trip-plate $n$ is pivotally supported upon two spaced ears $n'$ that project inward from said rail, as indicated in Fig. 1, one of said ears appearing in Fig. 3. The trip-plate $n$ at each gate-frame 8 is provided with an upright trigger-arm $n^2$, which is an upward extension from the pivot that supports the trip-plate at its inner edge or the one nearest a respective partition-wall $e$, and as the pivots of the trip-plate are rigid projections therefrom it will be seen that the arm $n^2$ will rock with the trip-plate.

Upon the inner side of a respective gate-frame 8 adjacent to the upper end of the trigger-arm $n^2$ a bracket-arm $n^3$ is secured and is bent so as to project down at the inner side of the trigger-arm and contact therewith when the trip-plate $n$ is depressed at its free edge a proper distance, the bracket-arm serving to limit such downward rocking movement of the trip-plate. A suitable weight $n^4$ is formed or secured on the edge of the trip-plate $n$ adjacent to the inner surface of the transverse rail $i^2$ of the gate-frame 8, said weight causing the inner or opposite edge of the trip-plate to be raised somewhat, and so normally held.

A toe $o$ is formed on the lowest slat of the wicket 9 of each gate-frame 8, and the length of the trigger-arm $n^2$ of said wicket is such that when the wicket is fully raised the upper end of the trigger-arm will be rocked by the weight $n^4$ on the trip-plate below and into engagement with the toe $o$, thus affording support for the wicket 9 in its raised adjustment.

Each compartment $b$ and $c$ has a doorway $p$ formed between it and a respective compartment $a$ $d$ by omitting one slat $e$ at the rear of each partition between said compartments, and a door $r$ is provided for the closure of each doorway. Each of the doors $r$ is pivoted, as at $r'$, near the normally upper edge of the same, upon the slats $e$, forming the jambs of the doorway, as shown by dotted lines in Fig. 3, and upon the transverse edge of each door that is uppermost when the doors are in closed condition a weight $r^2$ is formed or secured.

A bottom board $s$ is loosely fitted in each compartment $b$ $c$, and each bottom board is hinged, as at $s'$, upon the lower longitudinal base-strip $5^a$ at the front of the main frame of the trap-nests, these hinges that connect the front transverse edges of the bottom boards with said base-strip adapting the bottom boards for upward rocking movement toward their rear ends.

The compartments $b$ and $c$ are, to distinguish them, termed "trap-chambers," and the compartments $a$ $d$ are "nest-chambers."

As shown, the doors $r$, that may be called "trap-doors," have such a length from their pivots $r'$ as to adapt their lower edges to nearly approach the upper edges of respective nest-boxes 6 when rocked down for closure of the doorways opposite which said doors are located. Upon corresponding side edges of a rockable bottom board $s$ and a trap-door $r$ above it the ends of a link-rod $u$ are pivotally secured, as shown at $u'$, this connection of each bottom board with a respective trap-door and the weights on the latter adapting the doors to rock upward and fully open the doorways, at the same time raising the rear ends of the bottom boards so as to incline the latter, as represented in Figs. 1 and 3.

To adapt the improved nests for use, the main slatted structure that forms the outer wall of the twin nests is placed with its rear against or near an upright wall in a room of a chicken-house, so as to prevent entrance or exit at the rear, and the attendant raises the wickets 9, so as to permit hens to enter the nest-chambers $a$ and $d$. The entrance of a hen can only be effected by the depression of the trip-plate $n$, which will rock the trigger-arm $n^2$ away from the toe $o$ on the wicket 9, permitting the wicket to drop and close the front of the nest-chamber which the fowl has entered, and, if desired, this act may be signaled to an attendant by the ringing of an alarm-bell of any suitable construction; but as this is not an essential feature of the invention, and to avoid complicity of parts, it is omitted from the drawings. The hen after laying an egg in the nest naturally desires to leave the nest-chamber and passes through the doorway opposite the nest into the adjoining trap-chamber $b$ or $c$. The imposed weight of the hen depresses the hinged bottom board $s$, which through the link-rod $u$ automatically rocks the adjacent trap-door $r$ down into its doorway, and thus prevents a return of the hen into the nest-chamber. Observation will show if the fowl has laid an egg that has been preserved from being eaten by the trapping of the hen in the closed compartment. The hen may now be removed from the trap-chamber by sliding the gate-frame 8 across the inner side of the slatted main door 7 and the latter toward the opposite end of the main frame of the twin nests, which will open the front of the adjacent nest-chamber and trap-chamber, thus permitting the removal of the hen.

In order to determine if a selected hen has ceased to lay eggs, but from habit frequents a nest, the fowl may be confined in the nest-chamber by closing the door $r$ and holding it closed by means of a turn-button $r^3$. After the hen has been kept in the nest-chamber long enough to ascertain if she has ceased to lay eggs the button $r^3$ may be turned and the door $r$ be permitted to rock upward into its normal position.

Obviously if a tag or other means for identifying the hen has been attached thereto and a record kept of the dates when the hen lays such fowls as are infrequent layers may be culled from a flock of hens. Furthermore, the laying of certain strains of chickens may be tested by use of the improved trap-nests in suitable numbers.

As free access is afforded into the nest-chambers and trap-chambers of the improved trap-nests at their rear ends by the removal of the same from the wall against which said nests are placed, the nest-boxes 6 may be removed as frequently as is necessary, and said boxes, as well as the interiors of the chambers $a$, $b$, $c$, and $d$, may be thoroughly cleaned, lice exterminated, and the nest-boxes, as well as the frame portions of the trap-nests, be whitewashed to disinfect them.

Having thus described my invention, I claim as new and desire to secure by Letters Patent—

1. A trap-nest embodying a main frame or body open at the front, an apertured gate-frame laterally slidable across said front, a vertically-slidable wicket for closing the aperture in the gate when lowered, means for supporting the wicket elevated, and means for releasing the wicket so that it drops when a fowl enters the aperture in the gate.

2. A trap-nest embodying a slatted rectangular frame open at the front, an apertured gate-frame laterally slidable across said open front, a vertically-slidable wicket mounted upon the gate-frame, closing its aperture when lowered, a trip-plate carried by the gate-frame near the lower defining edge of the aperture therein, and means connecting the wicket and trip-plate and adapted to release the wicket, said means being actuated by the tread of a fowl on the trip-plate.

3. A trap-nest embodying a slatted rectangular frame open at the front, an apertured gate-frame laterally slidable across said open front, a slatted wicket vertically slidable on the gate-frame, means carried on said gate-frame for supporting the wicket elevated and the aperture uncovered, and means mounted upon the lower portion of the gate-frame and engaging the supporting means, the engaging means being actuated by the tread of a fowl passing through the aperture in the gate-frame.

4. A trap-nest embodying a slatted rectangular frame open at the front, a partition dividing the interior of the frame into a trap-chamber and a nest-chamber, said partition having a doorway therein near its rear end, a weighted trap-door hung in the doorway and normally opened by the weight thereon, a main door slidable across the open front ends of the two adjacent chambers, an apertured gate slidable across the front of the nest-chamber rearward of the main door, a wicket slidable vertically on the gate and, when lowered, closing the aperture therein, means for holding the wicket raised, a nest-box in the nest-chamber, means, actuated by the tread of a fowl entering the nest-chamber through the opening in the gate, for releasing the wicket that falls by gravity, and means for closing the weighted trap-door, actuated by the fowl entering the trap-chamber through the doorway guarded by said trap-door.

5. In a device of the character described, the combination with a slatted rectangular frame, open at the front and divided into compartments by a partition, of a main slatted door slidably held at the front and adapted for closure of the compartments, an apertured gate slidable at the front of the frame rearward of the main door, and adapted to partially close one compartment at its open front when the main door is open, a vertically-slidable wicket mounted upon the inner side of the gate, a trip-plate held to rock on the lower portion of the gate, a trigger-rod upwardly extended from the trip-plate and rocking therewith, and a projection on the wicket, engaged by the upper end of the trigger-rod, thus holding the wicket raised, a downward rocking movement of the trip-plate caused by the tread of a fowl releasing the wicket, that drops by gravity for closure of the aperture in the gate.

6. In a device of the character described, the combination with a slatted rectangular frame open at the front, a partition dividing the frame into compartments, said partition having a doorway near the rear end thereof, and means for temporarily closing the front, of a counterweighted door pivoted in the doorway, a hinged bottom board in one of said compartments, and a link-rod pivoted at its ends on the bottom board and on the counterweighted door, said door being rocked downward and held for the closure of the doorway by weight imposed upon the bottom board.

In testimony whereof I have signed my name to this specification in the presence of two subscribing witnesses.

CHARLES B. WILLIAMS.

Witnesses:
ELVA MAE WILLIAMS,
NELLIE WILLIAMS.